United States Patent [19]
Jarrett

[11] 4,414,641
[45] Nov. 8, 1983

[54] DIGITAL M OF N CORRELATION DEVICE HAVING INCREASED BIT RATE

[75] Inventor: Bobby R. Jarrett, Fredericksburg, Va.

[73] Assignee: The United States of America as represented by the Secretary of the Navy, Washington, D.C.

[21] Appl. No.: 269,125

[22] Filed: Jun. 1, 1981

[51] Int. Cl.³ .................. G06G 7/19; G06F 15/34; H03K 13/02
[52] U.S. Cl. .................. 364/728; 364/604; 340/347 DA
[58] Field of Search ........... 364/728, 769, 819, 824, 364/604, 571 C, 737 C; 340/146.2; 371/57

[56] References Cited

U.S. PATENT DOCUMENTS

| | | | |
|---|---|---|---|
| 3,303,335 | 2/1967 | Pryor | 235/181 |
| 3,582,943 | 6/1971 | Weller | 340/347 |
| 3,621,221 | 11/1971 | Cann | 364/824 |
| 3,670,151 | 6/1972 | Lindsay et al. | 235/181 |
| 3,831,013 | 8/1974 | Alsup et al. | 235/181 |
| 3,903,405 | 9/1975 | Gaskill, Jr. | 364/728 |
| 3,961,171 | 6/1976 | Freeman | 364/728 |

OTHER PUBLICATIONS

TRW LSI Products, TDC-1004J, Digital Correlator.
Mano, M. M., *Computer System Architecture*, N.J., Prentice-Hall, 1976, pp. 64–65.
*Analog-Digital Conversion Handbook*, MA., Analog Devices, Inc. 1972, pp. II-80–II-81, II-46–II-48.

*Primary Examiner*—Eddie P. Chan
*Assistant Examiner*—Ronni S. Malamud
*Attorney, Agent, or Firm*—R. S. Sciascia; A. L. Branning; J. G. Wynn

[57] ABSTRACT

A digital m of n correlation device using signal and reference shaft registers, modulo 2 adders, unique 1-bit D/A converters, and single resistor analog summing provides a very fast correlation product for pulse compression modulations such as phase or frequency shift keying. The compression ratio for the digital m of n correlation device, according to the present invention, is 168:1 (equal to the number of bits). The device is capable of bit rates in excess of 100 Mbps and is well suited for LSI fabrication.

13 Claims, 5 Drawing Figures

DIGITAL M OF N CORRELATION DEVICE HAVING INCREASED BIT RATE

BACKGROUND OF THE INVENTION

1. Field of the Invention

The present invention relates generally to digital correlation devices, but more particularly to a digital m of n correlation device encompassing a fast correlation product for pulse compression modulations such as phase or frequency shift keying, where m is equal to the number of agreements of signal and reference bits, and n is equal to the total number of bits.

2. Description of the Prior Art

In the field of radar the conflicting requirements of a short pulse for range resolution and a long pulse for increased probability of target detection have led to the development of radar pulse compression techniques for satisfying both of the foregoing requirements simultaneously. Pulse compression is accomplished by modulation of the carrier wave. For a given probability of detection with a peak power limited radar, the pulse duration will be determined by the peak and average power limitations. The precision of the range resolution will then be established by the number of bits in the overall pulse. The bandwidth time product $\beta T$ is a measure of the compression gained and is always greater that one (1) for pulse compression. Increasing the range resolution requires that the speed at which compression is accomplished be increased. The correlation device disclosed herein produces a very fast correlation product for pulse compression modulations such as phase or frequency shift keying. The compression ratio for the correlation device according to the present invention is 168:1 (equal to the number of bits). Moreover, the correlation bit rate is in excess of 100 Mbps, a speed heretofore unattained in the prior art. The correlation device is also well suited for large scale integration (LSI) fabrication. Hence, based on the foregoing it appears that a correlation device incorporating the concepts of the present invention is needed in the prior art.

In the past, both analog and digital summation processes and circuits for digital correlation have been used. The prevalent practice in the prior art is to add modulo 2 the bits in corresponding bit positions in reference and signal shift registers. This output, indicating the number of agreements by a binary ONE (or ZERO) in each bit position for which there is an agreement, is then summed either digitally or by analog techniques.

In the digital summation approach, the modulo 2 outputs are presented to an n-bit adder tree that converts the number of simultaneous ONE's presented on the n lines into a binary number. This binary number is then compared digitally with a desired threshold. The basic problem with the adder tree approach is that, as n increases, the size thereof becomes disproportionately large. Consequently, there is a need in the prior art to increase n without a disproportionate increase in size of the digital correlation device.

In the analog summation approach, the modulo 2 outputs are used to drive 1-bit digital-to analog (D/A) converters. The individual outputs from the D/A converters are summed to provide an analog representation of the total number of agreements. This value is then compared to an analog threshold in an analog comparator. The basic problem with the analog approach is the limitation on the speed that can be obtained when a large number of the 1-bit D/A converter outputs are brought together for analog summation. The capacitance created at the resulting node is the limiting factor on speed. Hence there is a need in the prior art to be able to use the analog summation approach but yet not limit the speed of correlation.

An example of the use of analog summation is disclosed in U.S. Pat. No. 3,670,151 to Lindsay et al, entitled "Correlators Using Shift Registers", filed June 5, 1970, and assigned to the same assignee as the present invention. Lindsay et al disclose, inter alia, a block diagram representation of a correlator using two shift registers having multivibrators whose outputs are summed by modulo 2 adders. The outputs of the adders are summed through a plurality of resistors functioning as 1-bit D/A converters. While Lindsay et al disclose basic concepts similar to the present invention, i.e., the use of signal and reference shift registers, modulo 2 addition and analog summation, the elements and techniques used are different from those used in the present invention and are not as conducive to high speed operation as the present invention.

Additional prior art such as U.S. Pat. No. 3,831,013 to Alsup et al, entitled, "Correlators Using Shift Registers" filed Feb. 20, 1973, and U.S. Pat. No. 3,303,335 to Pryor, entitled, "Digital Correlation System Having An Adjustable Impulse Generator", filed Apr. 25, 1963, and assigned to the same assignee as the present invention, and the prior art, as indicated hereinabove, include advances in digital correlation devices, including improvements in the signal to noise ratio, the adaptability for implementation by integrated circuitry and the use of shift registers as primary elements. However, insofar as can be determined, no prior art digital correlation device incorporates all of the improvements, features and advantages of the present invention.

OBJECTS OF THE INVENTION

Accordingly, an important object of the present invention is to increase the speed at which pulse compression is accomplished in a digital m of n correlation device.

A further object of the present invention is to increase n, the number of bits (word length capacity), while maintaining size integrity such that the device can be more easily implemented in LSI.

Still a further object of the present invention is to expand the usefulness of a digital m of n correlation device in terms of processing speed and flexibility.

Yet another object of the present invention is to construct a correlation device that has pattern agility, length agility, threshold agility and bit rate agility in an improved manner.

SUMMARY OF THE INVENTION

In accordance with the above stated objects, other objects, features and advantages, the present invention has as a primary purpose to obtain a correlation bit rate in excess of 100 Mbps, while maintaining a compression ratio for the digital correlation device of at least 168:1 (equal to the number of bits).

The essence of the present invention is in the unique method in which modulo 2 addition, one-bit D/A conversion, analog summation and threshold detection concepts are combined using temperature and power supply compensated emitter-coupled-logic (ECL) to accomplish the objects, and, accordingly, provide the features and advantages of the invention.

The purpose of the present invention is carried out by configuring the digital correlation device to include a signal shift register and a substantially identical reference shift register. Each of the aforementioned shift registers include a plurality of signal multivibrators and a plurality of reference multivibrators, respectively. In each of the situations mentioned, the set of multivibrators are arranged and/or coded in a predetermined manner so as to store a binary sequence in the signal shift register for comparison with the reference data in the reference shift register. The proper clock pulses are fed to each of the plurality of multivibrators of each of the shift registers. In turn, each of the multivibrators of each of the shift registers drive a corresponding one of a plurality of modulo 2 adders to provide one bit representations of agreement/disagreement. The modulo 2 adders are connected at their outputs each to an input of a corresponding plurality of 1-bit digital-to-analog (D/A) converters. The D/A converters are actually unique 1-bit digital-to-analog current sources which have been configured to allow a large number (in this case 168) of their outputs to be brought together for analog summation using a single analog summing resistor. This analog representation of the total number of bit agreements between corresponding bit positions in the signal and reference shift registers is then fed to one input of an analog comparator. An analog threshold reference voltage is established at the other input of the analog comparator by an n-bit D/A converter. The output of the analog comparator is the result of the fast m of n correlation.

BRIEF DESCRIPTION OF THE DRAWINGS

The previously stated objects, other objects, features and advantages of the present invention will be apparent from the following more particular description of the preferred embodiments as illustrated in the accompanying drawings, in which.

DESCRIPTION OF THE PREFERRED EMBODIMENTS

Figure 1:
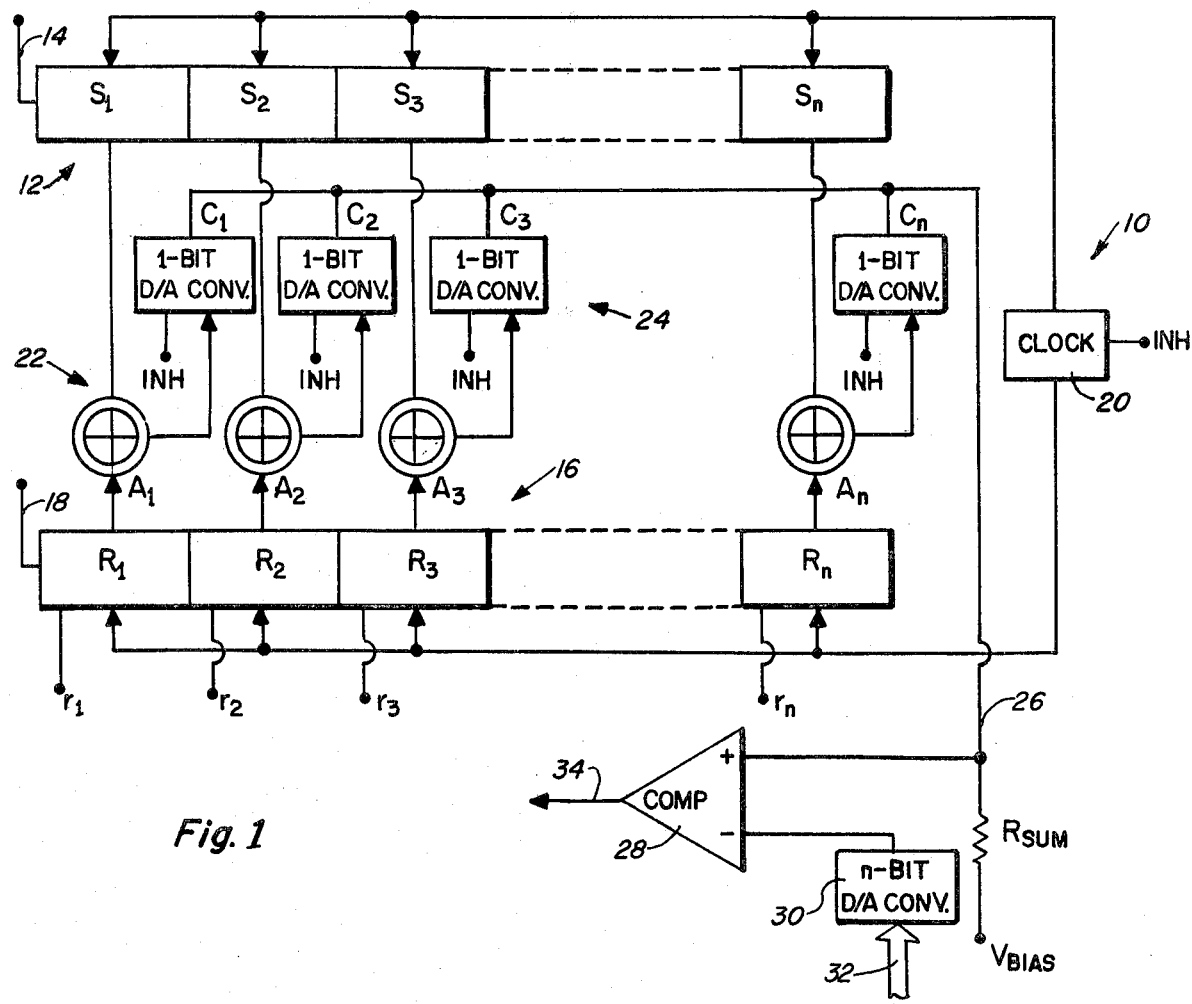
FIG. 1 is a block diagram representation of the digital m of n correlation device according to the present invention depicting, inter alia, the analog single resistor summation technique used.

FIG. 1 shows an embodiment of a digital m of n correlation device 10 in which the present invention is employed to increase the bit rate. It includes a signal shift register 12 which further includes a plurality of signal multivibrators $S_1$-$S_n$ serially connected as depicted. Signal data (not shown) is fed into signal multivibrator $S_1$ via signal input line 14. Likewise, the device includes a reference shift register 16 which further includes a plurality of reference multivibrators $R_1$-$R_n$ serially connected as depicted. Reference data (not shown) is fed into reference multivibrator $R_1$ via reference input line 18 or parallel inputs $r_1$-$r_n$.

One output of a clock 20 is connected to each signal multivibrator $S_1$-$S_n$ of signal shift register 12, and the other output thereof is connected to each reference multivibrator $R_1$-$R_n$ of reference shift register 16. Clock 20 can be inhibited via its inhibit input to prevent shifting the reference data in reference shift register 16 in order to maintain a particular reference pattern. As shown, the output of each signal multivibrator $S_1$-$S_n$ drives one input of corresponding adders $A_1$-$A_n$ of a plurality of modulo 2 adders 22 (Exclusive OR gates). Likewise, the output of each reference multivibrator $R_1$-$R_n$ of reference shift register 16 drives the other input of the corresponding adders $A_1$-$A_n$. The plurality of modulo 2 adders 22 are operatively connected to a plurality of 1-bit D/A converters 24. Each adder $A_1$-$A_n$ is connected to one input of corresponding converters $C_1$-$C_n$ of the plurality of 1-bit D/A converters 24, aforementioned. The other input (inhibit) of converters $C_1$-$C_n$ of the plurality of 1-bit D/A converters 24 can be used to shorten the length of digital m of n correlation device 10 i.e., length agility.

Still referring to FIG. 1, in the embodiment of the invention shown therein, the output of each of the plurality of 1-bit D/A converters 24 is connected to an analog summing line 26. The n individual analog outputs are summed across a single analog summing resistor, $R_{sum}$, connected at one end to a voltage supply, $V_{bias}$, and at its other end to both the aforementioned analog summing line 26 and the positive input of analog comparator 28. The negative or threshold voltage input of analog comparator 28 is driven by a n-bit D/A converter 30 operating as a threshold detector. The converter is, in turn, driven by a threshold data signal on operatively connected threshold data bus 32 which establishes the threshold as determined by m, the chosen number of bit agreements between the signal data and the reference data. Thus, the signal on output line 34 of analog comparator 28 is a digital indication of whether or not the total number of agreements between the bit positions in signal shift register 12 and reference shift register 16 exceed the threshold voltage established by n-bit D/A converter 30.

STATEMENT OF THE OPERATION

The present invention involves the manner in which modulo 2 addition, 1-bit D/A conversion, analog summation and analog threshold detection are accomplished together to form the digital m of n correlation device 10 of FIG. 1. A 168 bit correlator of the type shown in FIG. 1 was constructed capable of a bit rate in excess of 100 Mbps with a resolution of one bit.

The correlator was built using Fairchild F100k emitter-coupled-logic (ECL). The F100k series ECL has a typical gate delay of 750 ps and is both power supply and temperature compensated.

Figure 2:
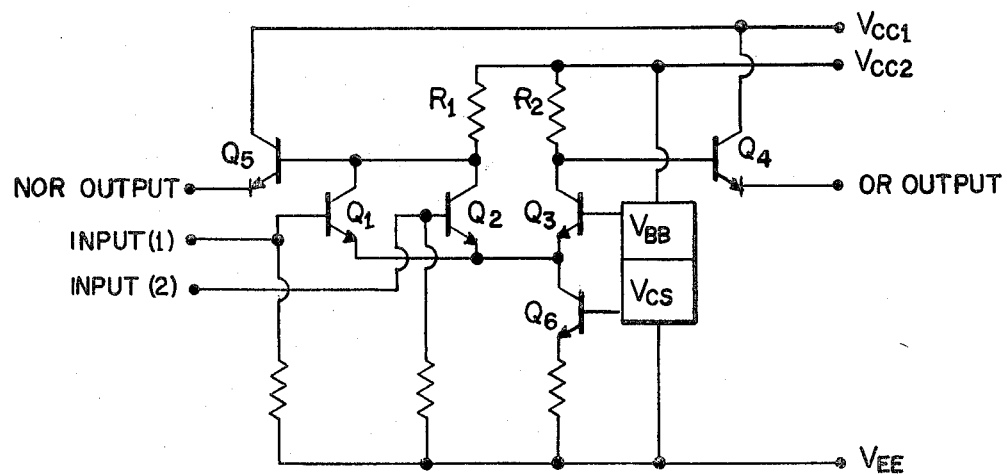
FIG. 2 is a circuit diagram of a typical emitter-coupled-logic (ECL) gate.

The basic Fairchild ECL gate is shown in FIG. 2. $Q_2$ and $Q_3$ form a current switch. The logic state is the resultant voltage drop across resistor $R_1$ or resistor $R_2$. Emitter followers $Q_4$ and $Q_5$ are added as shown. Only the OR output at the emitter of $Q_4$ is used in the present invention. The collectors of the emitter followers are returned to a separate power supply terminal $V_{CC1}$ which insures that any changes in load currents during switching do not cause spiking at power supply terminal $V_{CC2}$ within the ECL gate package.

Still referring to FIG. 2, the fact that the collector and emitter of, for example, $Q_4$ is available to a user coupled with the fact that the collector capacitance is very small (<1 pf) are put to advantage in configuring a digital m of n correlation device according to the present invention.

Figure 3A:
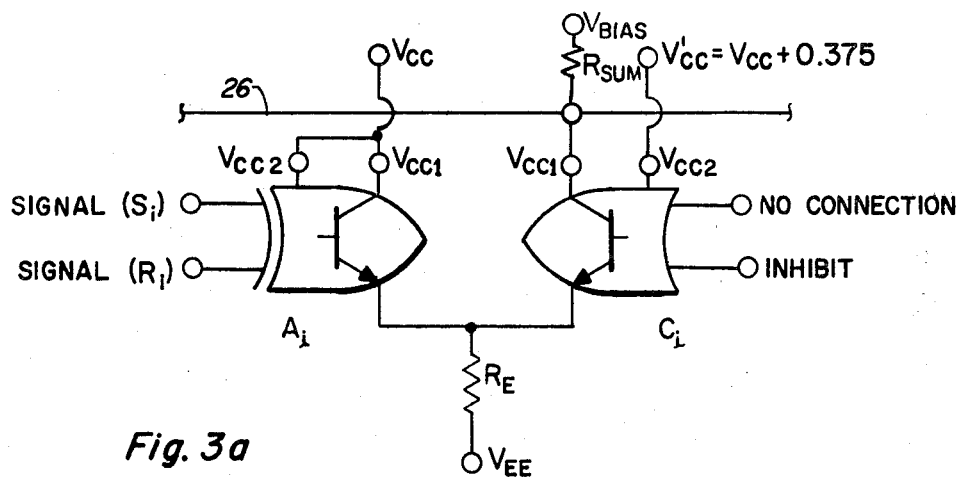
FIGS. 3a and 3b are schematics showing the connections of the ECL gate used in a 1-bit correlation process according to the present invention.

Still referring to the ECL gate circuit of FIG. 2 and concurrently with the circuit diagram of FIG. 3a, two different ECL gate outputs, for example $Q_4$, of each of the two ECL gates, are connected at their emitters via $R_E$ to voltage supply terminal $V_{EE}$ to form a binary current source (1-bit D/A converter, see FIG. 1) controlled by the inputs at $Q_1$ and $Q_2$ of one of the ECL gates (modulo 2 adder, see FIG. 1) which inputs are designated either as signal line $S_i$ or reference line $R_i$ or vice versa. However, to insure that one of the two transistors in FIG. 3a is always off, the $V_{CC2}$ terminal of $C_i$ is offset from the $V_{CC2}$ terminal of $A_i$. Thus, for purposes of the invention, $V_{CC}$ is zero (0) volt and $V'_{CC}=V_{CC}+0.375$ as shown.

Figure 3B:
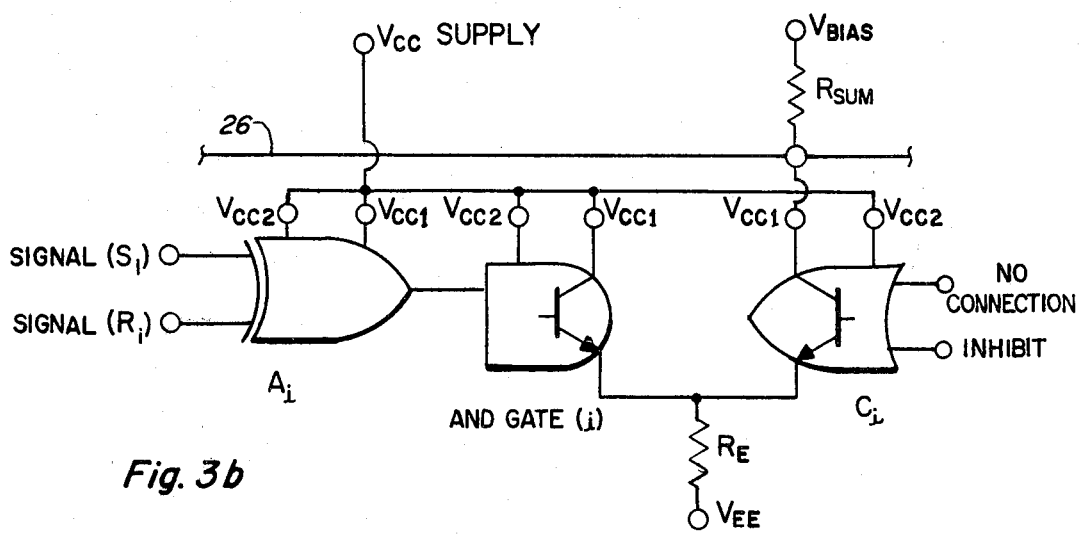

Referring now to FIG. 3b, an alternative approach to providing the necessary offset voltage without the necessity of a different power supply voltage $V'_{CC}$ is shown. The Fairchild F100123 Hex Bus Driver is used and connected as shown since its low level output voltage is more negative than the normal ECL gate outputs. Thus, this allows an emitter-follower output transistor thereof (the output portion of AND gate (i)) to be turned off and present a high impedance. This property was used to construct the version of the 1-bit D/A converter (binary current source) shown. When an appropriate load such as single analog summing resistor $R_{sum}$ is connected to the collector of the emitter-coupled ECL gate of FIG. 3a or FIG. 3b, the current output is converted to a voltage indicative of the number of agreements between corresponding bit positions in signal shift register 12 and reference shift register 16 (refer to FIG. 1). By tying the collectors of the 1-bit D/A converter $C_i$ to analog summing line 26 the currents are summed with the current per bit level being established by the value of the resistor $R_E$ in either FIG. 3a or FIG. 3b.

The capacitance at the collector of the emitter-coupled ECL gates of FIG. 3a or 3b is a limiting factor on the speed of the correlation device according to the present invention. Another limiting factor is the value of single analog resistor $R_{sum}$. Hence, for example, the bandwidth of the device can be estimated by using the formula, $f=0.159/(R_{sum}(nC))$, where f is the cutoff frequency in Hertz, $R_{sum}$ is the single analog summing resistor and has, in the present invention, the practical value of 1.0 ohm, n is the number of 1-bit D/A converters 24 (refer again to FIG. 1) and C is the capacitance at the output of a 1-bit D/A converter 24 and is about 1 picofarad (pf). Thus, for 168 bits, for example, the cutoff frequency is, $f=0.159/1\times168\times10^{-12}=0.946\times10^9$ Hz.

Figure 4:
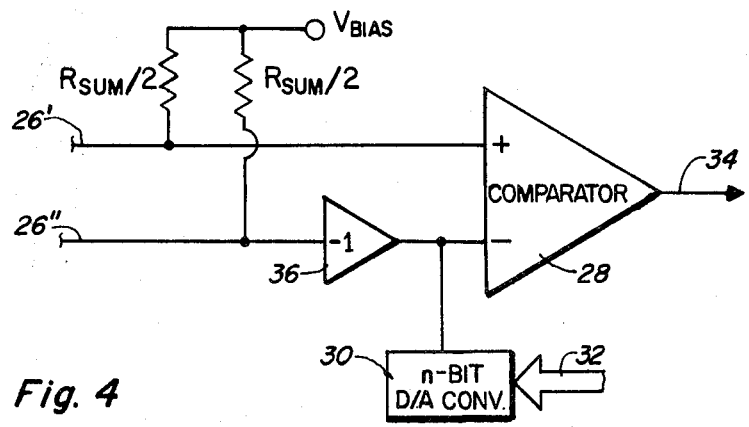
FIG. 4 is a circuit and block diagram representation of a split resistor approach to the single resistor summation technique of FIG. 1 to provide even faster speed of operation.

Referring again to FIG. 1 and to FIG. 4, in order to increase the speed of the device of the present invention even more, the summation operation is split. Half of the 1-bit D/A converters 24 drive analog summing line 26' and the other half of the 1-bit D/A converters 24 drive analog summing line 26". Thus, each voltage part of the summation operation is supplied to one input of analog comparator 28 with the value of the split summing resistors each being one-half of the value of single analog summing resistor $R_{sum}$. The polarity of the signal on analog summing line 26" is made opposite of that on analog summing line 26' by using an inverter 36 at the negative input of analog comparator 26.

To those skilled in the art, many modifications and variations of the present invention are possible in light of the above teachings. It is therefore to be understood that the present invention may be practiced otherwise than as specifically described herein and still be within the spirit and scope of the appended claims.

What is claimed is:

1. A digital correlation device for producing a voltage sum corresponding to n individual analog currents in accordance with the bits in corresponding bit positions, the n individual analog currents being indicative of the number of agreements/disagreements in the corresponding bit positions, which comprises:

a signal shift register including a plurality of signal multivibrators $S_1$-$S_n$ arranged in a predetermined manner so as to store a binary sequence of signal data inputted at a signal input line of said signal shift register;

a reference shift register including a plurality of reference multivibrators $R_1$-$R_n$ arranged in a predetermined manner so as to store a binary sequence of reference data inputted thereto;

a clock having one output operatively connected to said signal shift register and another output operatively connected to said reference shift register for shifting the states of the signal multivibrators $S_1$-$S_n$ and the reference multivibrators $R_1$-$R_n$ according to the modulation frequency of the signal data;

a plurality of modulo 2 adders $A_1$-$A_n$ operatively connected at each of their two inputs to the outputs of corresponding signal multivibrators $S_1$-$S_n$ of said signal shift register and reference multivibrators $R_1$-$R_n$ of said reference shift register for modulo 2 summing of the two bits in corresponding bit positions of said signal and said reference shift registers to provide a single bit representation of the agreements/disagreements in the corresponding bit positions; and a plurality of 1-bit digital-to-analog converters $C_1$-$C_n$ operatively connected at one input to the corresponding output of each of said plurality of modulo 2 adders and at their outputs collectively to one end of a single analog summing resistor, the other end of said single analog summing resistor being connected to a voltage supply, said single summing resistor being an integral part of each one of said plurality of 1-bit digital-to-analog converters $C_1$-$C_n$ so that they operate to convert the single bit representative of the agreements/disagreements of the n individual analog currents into the voltage sum.

2. The digital correlation device according to claim 1 wherein the predetermined manner in which said multivibrators, $S_1$-$S_n$, are arranged is serially.

3. The digital correlation device according to claim 2 wherein the predetermined manner in which said multivibrators, $R_1$-$R_n$, are arranged is serially and the reference data is fed to a reference input line of said reference shift register.

4. The digital correlation device according to claim 3 wherein the predetermined manner in which said multivibrators, $R_1$-$R_n$, are arranged is serially and the reference data is fed to parallel inputs, $r_1$-$r_n$.

5. The digital correlation device according to claim 4 wherein said clock includes an inhibit input for inhibiting the output thereof connected to said reference shift register to prevent shifting the reference data out of said reference shift register.

6. The digital correlation device according to claim 5 wherein said plurality of 1-bit digital-to-analog converters each includes an inhibit input for shortening the length of said digital correlation device.

7. A digital m of n correlation device for producing a digital indication at its output of whether or not the number of agreements in corresponding bit positions equals or exceeds the number m, and wherein n is the number of possible agreements, which comprises:

a signal shift register including a plurality of signal multivibrators $S_1$-$S_n$ arranged in a predetermined manner so as to store a binary sequence of signal data inputted at a signal input line of said signal shift register;

a reference shift register including a plurality of reference multivibrators $R_1$-$R_n$ arranged in a predetermined manner so as to store a binary sequence of reference data inputted thereto;

a clock having one output operatively connected to said signal shift register and another output operatively connected to said reference shift register for shifting the states of the signal multivibrators $S_1$-$S_n$ and the reference multivibrators $R_1$-$R_n$ according to the modulation frequency of the signal data;

a plurality of modulo 2 adders $A_1$-$A_n$ operatively connected at each of their two inputs to the outputs of corresponding signal multivibrators $S_1$-$S_n$ of said signal shift register and reference multivibrators $R_1$-$R_n$ of said reference shift register for modulo 2 summing of the two bits in corresponding bits positions of said signal and said reference shift registers to provide a single bit representation of the agreements/disagreements in the corresponding bit positions;

a plurality of 1-bit digital-to-analog converters $C_1$-$C_n$ operatively connected at one input to the corresponding output of each of said plurality of modulo 2 adders and at their outputs collectively to one end of a single analog summing resistor, the other end of said single analog summing resistor being connected to a voltage supply, said single analog summing resistor being an integral part of each one of said plurality of 1-bit digital-to-analog converters $C_1$-$C_n$ so that they operate to convert the single bit representative of the agreements/disagreements of n individual analog currents into a voltage sum;

an analog comparator for comparing the voltage sum from said single analog summing resistor, connected at one input thereof with a threshold voltage, as determined by the threshold number m, connected at the other input thereof; and a n-bit digital-to-analog converter for establishing the threshold voltage, operatively connected to the other input of said analog comparator, and having its input connected to a threshold data bus, such that the output of said analog comparator is the digital indication of whether or not the total number of agreements between the bit positions in said signal shift register and said reference shift register exceed the threshold voltage as established by said n-bit digital-to-analog converter.

8. The digital m of n correlation device according to claim 7 wherein the predetermined manner in which said multivibrators, $S_1$-$S_n$ are arranged is serially.

9. The digital m of n correlation device according to claim 8 wherein the predetermined manner in which said multivibrators, $R_1$-$R_n$, are arranged is serially and the reference data is fed to a reference input line of said reference shift register.

10. The digital m of n correlation device according to claim 9 wherein the predetermined manner in which said multivibrators, $R_1$-$R_n$, are arranged is serially and the reference data is fed to parallel inputs, $r_1$-$r_n$.

11. The digital m of n correlation device according to claim 10 wherein said clock includes an inhibit input for inhibiting the output thereof connected to said reference shift register to prevent shifting the reference data out of said reference shift register.

12. The digital m of n correlation device according to claim 11 wherein said plurality of 1-bit digital-to-analog converters each includes an inhibit input for shortening the length of said digital m of n correlation device.

13. The digital m of n correlation device of claim 12 wherein half of said plurality of 1-bit digital-to-analog converters drives a first section of an analog summing line and the other half thereof drives a second section of the analog summing line, the first and second sections of the analog summing line being connected to first and second split summing resistors, respectively, with the value of each being one-half of the value of said single analog summing resistor, the other ends of said split summing resistors being connected to a voltage supply, the first section of the analog summing line being connected to the one input of said analog comparator and the second section of the analog summing line being connected to the input of an inverter, the output of said inverter being connected to the other input of said analog comparator, such that the polarity of the particular voltage sum at the other input of said analog comparator is opposite of that at the one input thereof, the splitting of the analog summation operation increasing the speed of operation to substantially double the previous value.

* * * * *